(12) United States Patent
Tietjen

(10) Patent No.: US 9,448,319 B2
(45) Date of Patent: Sep. 20, 2016

(54) ALL FIBER TOWED ARRAY

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1098 days.

(21) Appl. No.: 12/907,603

(22) Filed: Oct. 19, 2010

(65) Prior Publication Data

US 2011/0176811 A1 Jul. 21, 2011

Related U.S. Application Data

(60) Provisional application No. 61/253,386, filed on Oct. 20, 2009.

(51) Int. Cl.
*G01V 1/38* (2006.01)

(52) U.S. Cl.
CPC .................................. *G01V 1/3808* (2013.01)

(58) Field of Classification Search
CPC ... G01V 1/3808; G01V 1/3835; H04B 10/00
USPC ................ 250/221, 227.14–227.18, 227.23, 250/227.24, 227.28; 385/5, 7, 9; 73/290, 73/587, 645; 398/13, 115; 367/149
See application file for complete search history.

(56) References Cited

U.S. PATENT DOCUMENTS

| | | | |
|---|---|---|---|
| 4,162,397 A | 7/1979 | Bucaro et al. | |
| 4,238,856 A | 12/1980 | Bucaro et al. | |
| 4,313,185 A | 1/1982 | Chovan | |
| 4,488,040 A | 12/1984 | Rowe | |
| 4,743,113 A | 5/1988 | Jubinski | |
| 4,799,202 A * | 1/1989 | Assard | 367/149 |
| 4,865,416 A * | 9/1989 | Pratt | 385/12 |
| 5,118,931 A | 6/1992 | Udd et al. | |
| 5,140,559 A | 8/1992 | Fisher | |
| 5,218,419 A | 6/1993 | Lipson et al. | |
| 5,247,490 A | 9/1993 | Goepel et al. | |
| 5,345,522 A | 9/1994 | Vali et al. | |
| 5,532,979 A * | 7/1996 | Hansen et al. | 367/106 |
| 5,574,699 A * | 11/1996 | Cuomo | 367/149 |
| 5,625,605 A | 4/1997 | Sullivan et al. | |
| 6,215,732 B1 * | 4/2001 | Nugent | 367/134 |
| 6,249,622 B1 * | 6/2001 | Hodgson et al. | 385/24 |
| 6,659,957 B1 | 12/2003 | Vardi et al. | |
| 6,699,192 B2 | 3/2004 | Ogawa | |
| 6,972,678 B2 * | 12/2005 | Houston et al. | 340/539.1 |
| 6,984,819 B2 | 1/2006 | Ogawa | |
| 2004/0247223 A1 * | 12/2004 | Tietjen | 385/7 |
| 2010/0039897 A1 * | 2/2010 | Beasley | 367/79 |

* cited by examiner

*Primary Examiner* — Georgia Y Epps
*Assistant Examiner* — Don Williams
(74) *Attorney, Agent, or Firm* — Howard IP Law Group, P.C.

(57) ABSTRACT

A system and method for an acoustic sensor array of a bundle of N different length optical fiber sensors. A coherent or noncoherent light source is input to each fiber for transmission along the length of the fiber. The light signal is reflected back at the fiber end point, and the resulting reflected light is diverted to an optical receiver so that perturbations of intensity and/or phase may be extracted.

17 Claims, 5 Drawing Sheets

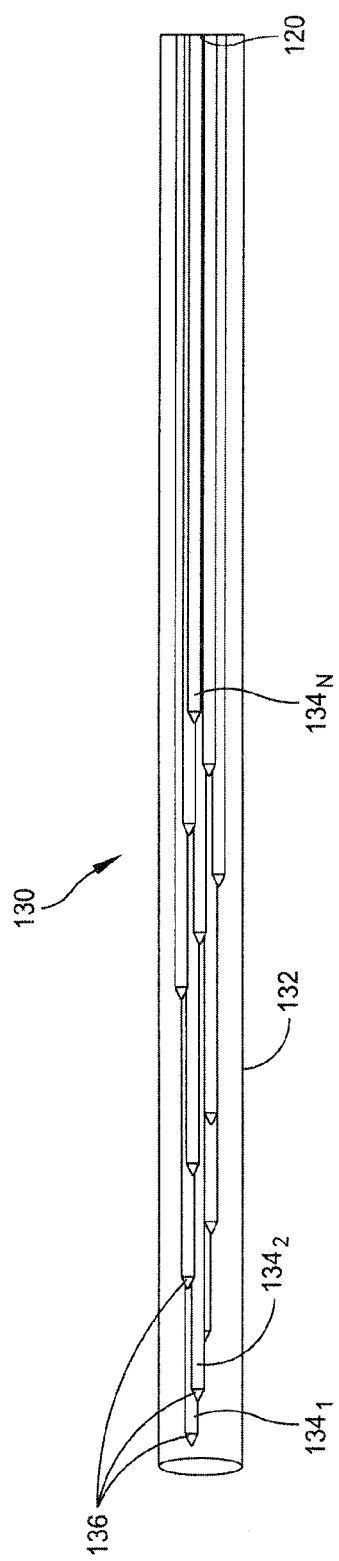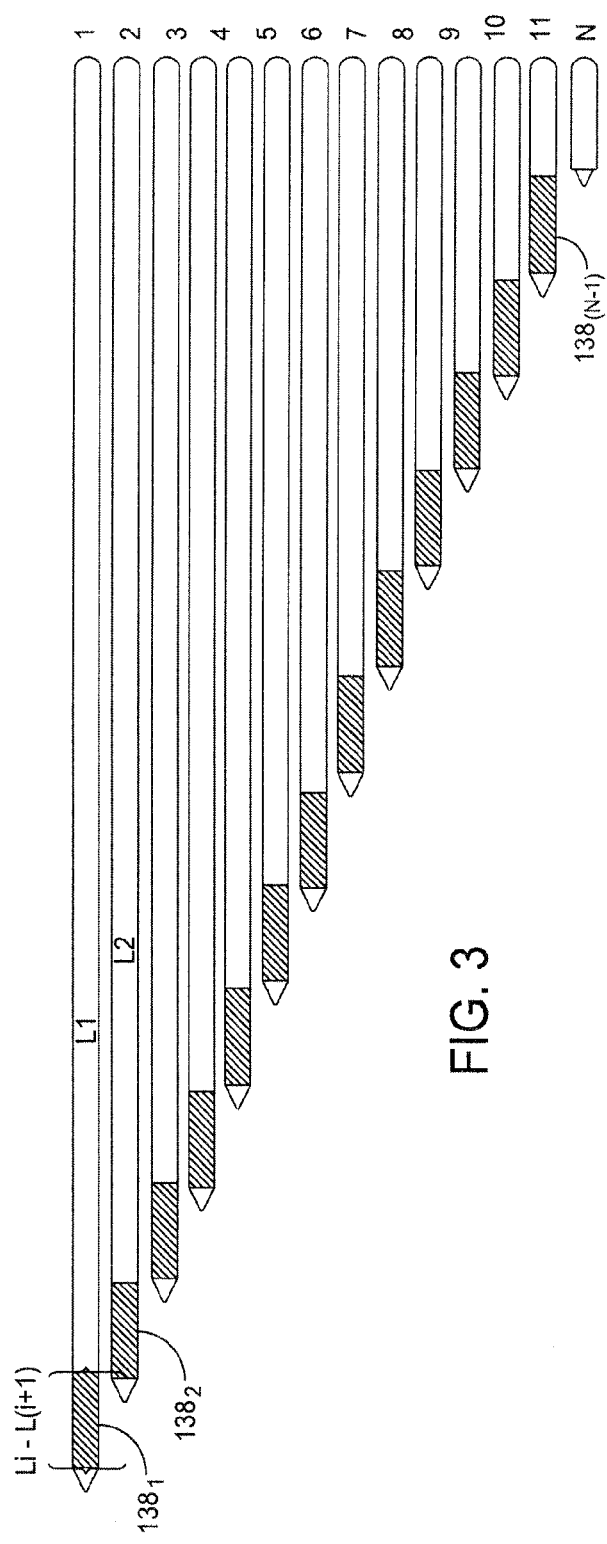

ALL FIBER TOWED ARRAY

CROSS-REFERENCE TO RELATED APPLICATIONS

This application claims priority under 35 U.S.C. §119(e) to Provisional Patent Application Ser. No. 61/253,386 entitled "ALL FIBER TOWED ARRAY" filed Oct. 20, 2009, the subject matter thereof incorporated by reference in its entirety.

FIELD OF THE INVENTION

The present invention relates generally to the field of fiber optic acoustic sensor arrays.

BACKGROUND

Civilian and military sea vessels use acoustic sensor arrays, for example, both active and passive sonar systems for numerous purposes including geological studies, marine life exploration, and military operations such as anti-submarine warfare (ASW). These systems are used to detect the presence of submerged objects by either transmitting a sound wave and detecting its reflection as it propagates through the water (active sonar) or by listening for sound waves generated by these objects (passive sonar).

The use of passive sonar systems may be advantageous over active systems, as passive systems are "silent" in operation. Specifically, a host vessel's location is not reveled by the use of passive sonar systems, whereas the transmission of a sound wave (a "ping") by an active sonar system, while potentially providing range and bearing information of a target, also greatly increases the ability of other vessels to detect these pings, and thus the presence and/or location of a searching vessel. Accordingly, passive sonar is particularly useful in military operations, such as ASW, where undetected operation is of critical importance.

A drawback of passive sonar, however, is that it is subject to interference, particularly by noise emitted from the host vessel as well as various types of flow-noise, such as turbulent boundary layer (TBL) noise. For example, noise from the vessel's propulsion system may negatively impact the operation of a passive system. This is especially true in the case of hull-mounted arrays, where hull-born vibrations and other noises are transferred directly to the sonar transducers. In order to locate the array further from the vessel's noise-producing components, and thus reduce interference, sonar arrays are often towed behind vessels.

Fiber optic-based acoustic sensors represent promising alternatives to conventional electronic sensors, such as transducer-based hydrophones. Advantages of fiber optic sensors include high sensitivity, large dynamic range, improved channel-to-channel isolation, lightweight and compact size. These optic-based sensors may be particularly useful in towed array sonar systems. In operation, acoustic waves propagating through a medium, such as water, are incident on an optical fiber which results in corresponding changes in length and index of refraction of the fiber. Such environmental changes in turn cause changes in one or more characteristics of the light signal, such as a change in the intensity, phase and/or polarization of a light pulse propagating through the fiber.

Current optical sensors require some form of mechanical device to contain an optical modulating scheme, whether for phase or intensity modulation. Phase devices can be implemented by, for example, a mandrel with an optical fiber wrapped around it, while intensity modulation sensors require mechanical devices to impart some type of mechanical movement to modulate the intensity of light propagating through the fiber. Current optical sensor arrays may also require electronics in the form of demodulation electronics or optical sources contained within the sensor array. The complexity of the array increases by adding these mechanical and electrical devices, resulting in a corresponding increase in cost, and decrease in reliability.

Alternative designs which may reduce cost and/or complexity, as well as increase reliability, are desired.

SUMMARY

In one embodiment of the present invention, an apparatus for use in an acousto-optical sensor array is provided. The apparatus may include a plurality of at least partially overlapping optical fibers configured to sense an acoustic signal. The optical fibers may be configured to output an optical signal indicative of the sensed acoustic signal to a receiver. A processor may be provided, and responsive to the receiver for extracting the acoustic signal sensed from non-overlapping portions of the optical fibers.

In another embodiment of the present invention, a method for processing optical signals is provided. The method includes the steps of inputting optical signals to a plurality of at least partially overlapping optical fibers. The optical fibers are operative to output optical signals indicative of a sensed acoustic signal received by the fibers. Finally, the sensed acoustic signals are processed by extracting the portion of the acoustic signal sensed by the non-overlapping portions of the optical fibers.

In yet another embodiment of the present invention, an optical sensor array system for use in a towed array is provided. The system includes a towing platform, such as a sea vessel, an array comprising a plurality of optical fibers configured to sense an acoustic signal, and a control system arranged on the towing platform. This embodiment provides for completely "all optical" acoustic sensors, providing the advantages of simplicity, reliability, low cost, resistance to electromagnetic interference, and improved channel to channel isolation.

BRIEF DESCRIPTION OF THE DRAWINGS

FIG. 2 shows a more detailed view of the all fiber towed array of FIG. 1.

FIG. 3 shows a more detailed view of the optical fibers of FIG. 2.

DETAILED DESCRIPTION

Figure 1:
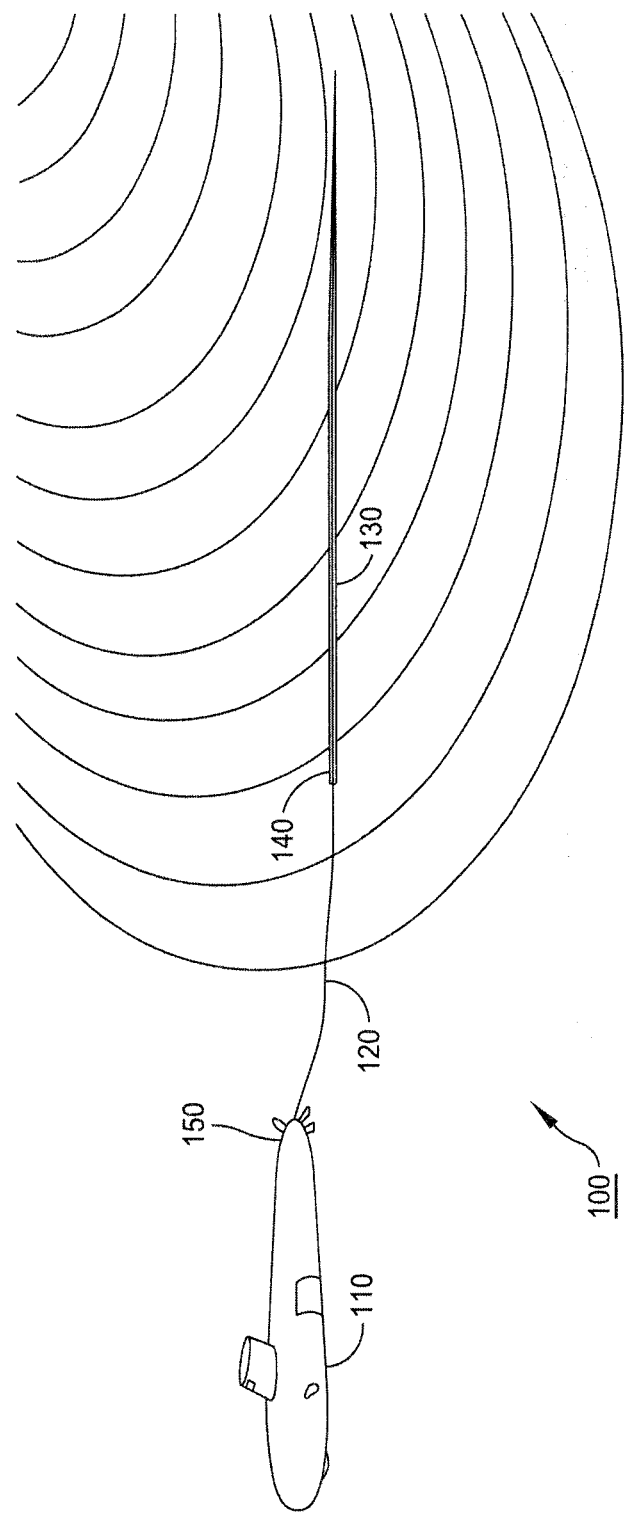
FIG. 1 shows a system diagram of an all fiber towed array coupled to a towing platform, such as a submarine, according to an exemplary embodiment of the present invention.

It is to be understood that the figures and descriptions of the present invention have been simplified to illustrate elements that are relevant for a clear understanding of the present invention, while eliminating, for purposes of clarity, many other elements found in typical sonar or optical sensor based systems, such as in towed optical sonar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

In accordance with an exemplary embodiment of the present invention, FIG. 1 shows a system 100 including a towing platform 110, by way of example only, a submarine or surface ship configured for towing an all fiber towed array ("AFTA") 130. AFTA 130 may be coupled to towing platform 110 by a fiber-optic tow cable 120. In one embodiment of the present invention, system 100 allows for containment of all electronics and discrete mechanical devices within towing platform 110. Accordingly, AFTA 130 may consist of substantially only a bundle of optical fibers disposed within in a housing or cable jacket, as shown and described herein in further detail.

Fiber-optic tow cable 120 may be adapted to transmit optical signals from towing platform 110 to AFTA 130 and return optical signals from AFTA 130 to towing platform 110. AFTA 130 may comprise an extension of tow cable 120. In other words, tow cable 120 may contain the same number of optical fibers as AFTA 130 and each optical fiber of AFTA 130 may be an extension of a corresponding optical fiber of tow cable 120. As such, the fiber-optic tow cable 120 may be a conventional fiber-optic tow cable, containing a bundle of optical fibers sheathed in a protective housing. The optical fiber bundle of fiber-optic tow cable 120 may comprise conventional optical fibers, such as single-mode optical fibers or multi-mode optical fibers, for example. The housing of fiber-optic tow cable 120 may be a conventional housing for fiber-optic bundles sufficient to facilitate towing of AFTA 130 by platform 110.

In an exemplary embodiment, the AFTA 130 is integrally formed at an end of tow cable 120. Therefore, no coupling structure is needed to attach AFTA 130 to tow cable 120. In an alternative embodiment, fiber-optic tow cable 120 may be communicatively coupled to AFTA 130 at a coupling region (or coupler) 140. In such an embodiment, ends of each fiber of optical fiber bundle 134 (described in reference to FIG. 2 below) may be optically coupled to the optical fiber of fiber-optic tow cable 120 by a focusing lens such that light pulses are focused for transmission. In this way, the number of optical fibers comprising the tow cable 120 may be the same or different than the number of fibers comprising the AFTA 130. For clarity, reference may be made to the focusing lens of FIG. 4 of U.S. Published Application No. 2004/0247223, the subject matter thereof incorporated herein by reference in its entirety. Coupler 140 may contain no discrete mechanical devices for controlling or operating the optical sensors of AFTA 130.

A second end of fiber-optic tow cable 120 may be communicatively coupled to tow platform 110 at a coupling area 150. Coupling area 150 may provide for each optical fiber of fiber-optic tow cable 120 to optically couple to a corresponding optical fiber provided by tow platform 110. Tow platform 110 may contain all electronics and discrete mechanical devices to control, transmit, receive, and process optical transmissions.

FIG. 2 shows a more detailed view of the optical fiber sensors constituting AFTA 130 of FIG. 1. As shown, AFTA 130 provides an optical towed array sensor, free of electronics or discrete mechanical devices. AFTA 130 consists of an array of N optical fibers $134_1$, $134_2$, ..., $134_N$ (referred to collectively as optical fibers 134) sheathed within a housing 132, where each fiber may be identified as $134_i$ where i=1, ..., N. Each of the N optical fibers $134_i$ may have a length for i=1, ..., N. Each of the optical fibers $134_i$ may be of a different length $L_i$ and be operative as an independent acoustic sensor. The difference in length ($L_i - L_{(i+1)}$) between various optical fibers ($134_i$ and $134_{(i+1)}$) may be uniform or may vary according to the specific needs and limitations of an AFTA 130. Each of the optical fibers $134_i$ may be a conventional optical fiber, such as single-mode or multi-mode optical fiber for example. Each optical fiber $134_i$ may have a reflective end 136 operative to reflect optical signals transmitted the length of fiber $134_i$.

Each fiber may operate as a sensor of extended length $L_i$ (i.e., each optical fiber $134_i$ receives acoustic signals effectively along its entire length $L_i$). Specifically, each optical fiber $134_i$ may be operative to receive light or light pulses of an optical signal at an input thereof, and to sense acoustic pressure that causes change in a characteristic of the light pulses transmitted therethrough indicative of the sensed pressure. In an exemplary embodiment, the characteristic change may be a change in phase of the optical signal associated with a given optical fiber $134_i$. Alternatively, the sensed parameter may be intensity, amplitude, frequency or other optical characteristics of the light signal.

In one embodiment of the present invention, the acoustic signals of interest may be obtained by subtracting one fiber output from another, as described in more detail in relation to FIG. 4 below. The resulting difference represents the acoustic signal along the non-overlapping portions of those optical fibers being differenced (see FIG. 3). Accordingly, such an embodiment may reduce or minimize the microphonic effects along the long length of fibers in the array. Specifically, along similar fiber paths, amplitude and phase variations in each optical fiber will be similar such that the unwanted returns can be cancelled out to leave only the signal of interest.

FIG. 3 shows an exemplary embodiment of unbundled optical fibers 134 of AFTA 130. As shown, the difference in optical fiber lengths ($L_i - L_{(i+1)}$) of consecutive optical fibers ($134_i$ and $134_{(i+1)}$) defines an array of virtual elements $138_1$, $138_2$, ..., $138_{(N-1)}$, which is shown in FIG. 3 as a shaded region of each optical fiber $134_i$. Each virtual element 138; may operate as an extended hydrophone of length $L_i - L_{(i+1)}$, thereby reducing flow noise along the long length of the fibers in the array. As set forth above, return signals generated by these virtual elements 138 are derived from subtracting the outputs of consecutive optical fibers 134.

Figure 4:
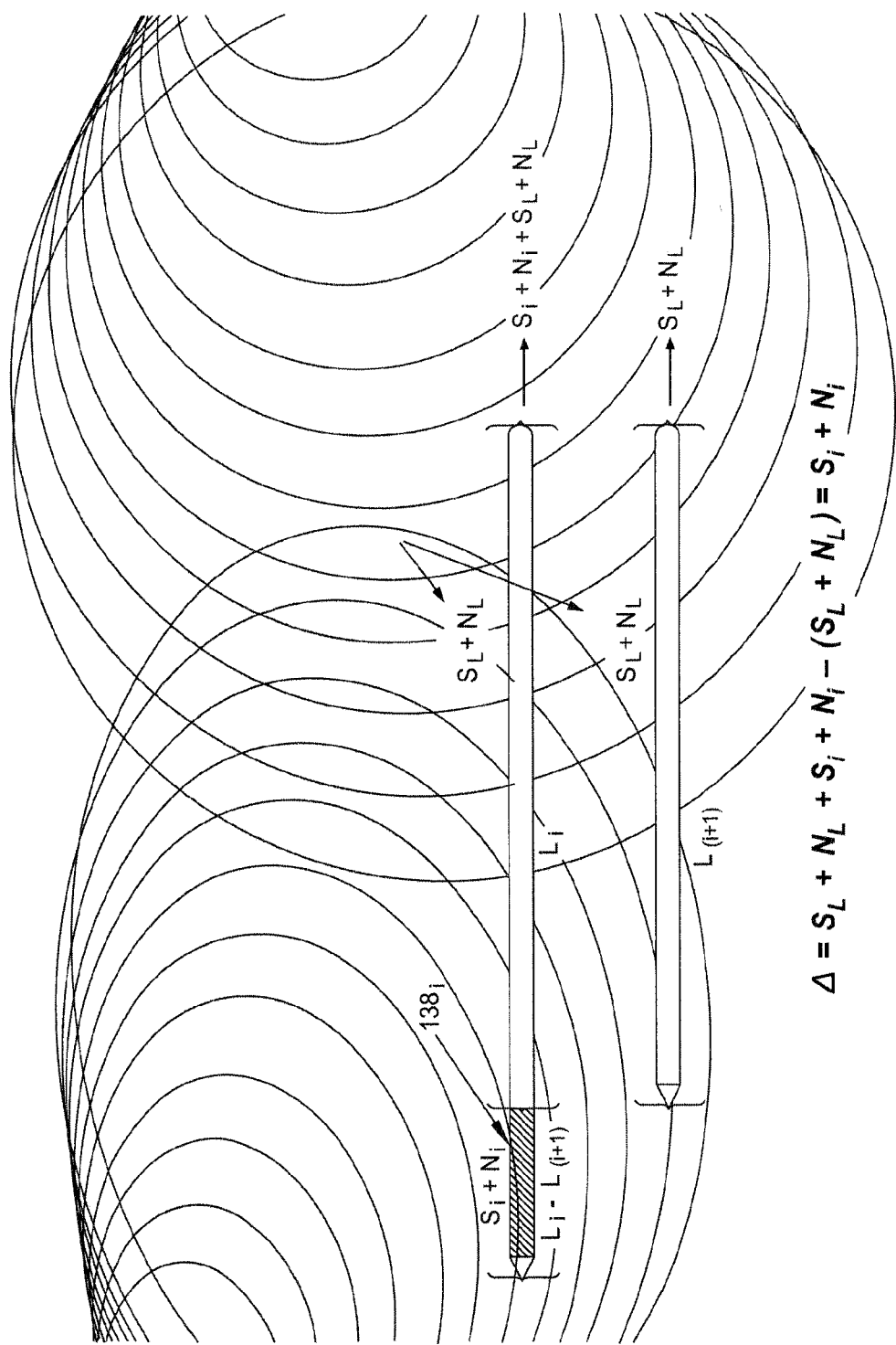
FIG. 4 shows a representative method of determining signal and noise received by a virtual element of the all fiber towed array of FIG. 1.

FIG. 4 shows the calculation of signal and noise data received by a virtual element $138_i$. As set forth above, each optical fiber $134_i$ operates as a sensor and receives signal and noise along its entire length $L_i$. The signal and noise may be introduced from many sources, such as flow noise, signal, thermal noise, and mechanical vibrations, by way of example only. The signal $S_i$ and noise $N_i$ for a virtual element $138_i$ may be calculated by subtracting the signal and noise measured over the entire length $L_{(i+1)}$ of the consecutive optical fiber $134_{(i+1)}$ from the signal and noise measured over the entire length $L_i$ of optical fiber $134_i$.

Figure 5:
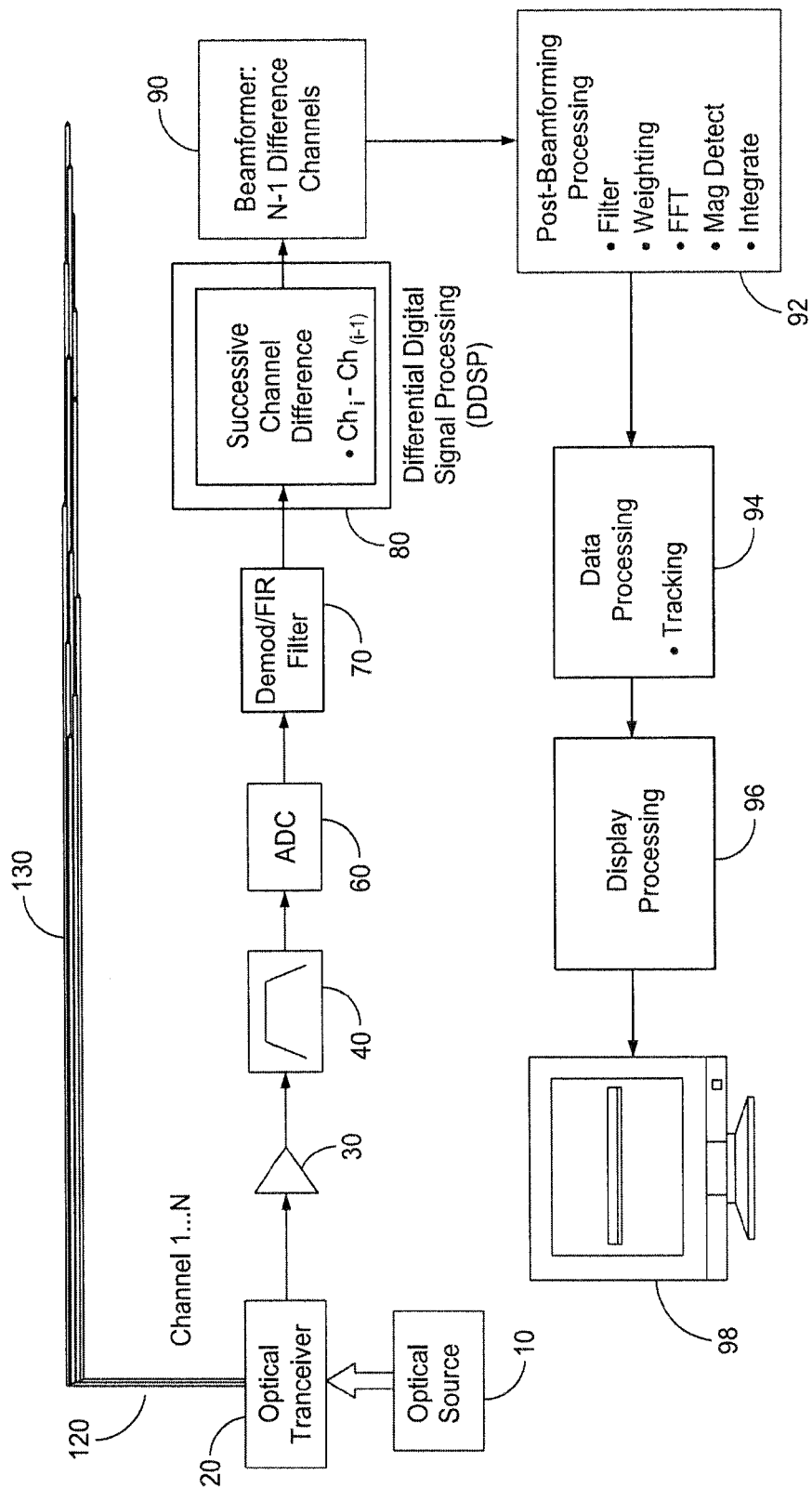
FIG. 5 shows a block diagram of the signal processing for determining the signal and noise of interest.

FIG. 5 shows an exemplary signal processing system 200 for determining the signal and noise of interest. Optical source 10 may be a conventional optical source adapted to produce N phase and frequency coherent optical signals to be transmitted to optical transceiver 20. Optical source 10 may be, by way of non-limiting example, a narrow-band laser. Optical transceiver 20 may be a conventional optical transceiver adapted to receive N optical signals from optical source 10 and transmit N optical signals to fiber-optic tow cable 120. Fiber-optic tow cable 120 is adapted to transmit the N optical signals to AFTA 130, receive back N optical signals from AFTA 130, and transmit those N optical signals received from AFTA 130 to optical transceiver 20. Optical transceiver 20 may then receive the N optical signals from fiber-optic tow cable 120 and output N received analog signals to pre-amp 30.

Pre-amp 30 may be a conventional pre-amp adapted to receive N analog signals from optical transceiver 20, amplify the received analog signals, and transmit N amplified analog signals to band pass filter 40. Band pass filter 40 may be a conventional band-pass filter adapted to receive N amplified analog signals from pre-amp 30, filter out amplified received analog signals outside of the band of interest, and transmit band pass filtered received analog signals to analog/digital converter 60. Analog/digital converter 60 may be a conventional analog/digital converter adapted to receive N analog band pass filtered signals from band pass filter 40 and provide N digital signals to demodulator/finite impulse response (FIR) filter 70. Demodulator/FIR filter 70 may be a conventional FIR filter operative to filter the received N digital signals and transmit them to successive channel difference device 80. The demodulator/FIR 70 filter will demodulate and filter the signals from the analog/digital converter 60 to I/Q baseband signals. In alternative embodiments of the present invention the FIR filter of the demodulator/FIR filter 70 may be replaced with an Infinite Impulse Response (IIR) filter which would provide the same functionality as the FIR filter.

Successive channel difference device 80 may be implemented as a conventional processing device adapted to receive N baseband digital I/Q signals, perform differential digital signal processing (DDSP) on the N signals, and output to beamformer 90 N−1 difference channels. For each of the channels $Ch_1 \ldots Ch_{(N-1)}$, the DDSP will compute the difference channel by computing the difference of successive channels ($Ch_i - Ch_{(i+1)}$). Successive channel difference device 80 effectively produces channels containing the data received by virtual elements $138_1 \ldots 138_{(N-1)}$ and provides these N−1 channels to beamformer 90. In this way, unwanted noise and signals which are common to the fibers will be significantly reduced, yielding a useful signal at each virtual element. Each virtual element will be of some physical extent, which will allow it to serve as an extended sensor. Extended sensors are desirable because they reduce flow noise as the towed array is towed through the water.

Beamformer 90 may be a conventional beamformer adapted to receive N−1 channels of baseband digital I/O signals and provide beamformed signal data to post-beamforming processing device 92. Post-beamforming processing device 92 may be a conventional post-beamforming device adapted to receive beamformed signal data from beamformer 90, perform conventional post-beamforming processing such as filtering data, weighting data, performing a Fast Fourier Transform (FFT), detecting magnitude, and integrating, and output data to data processing device 94. Data processing device 94 may be a conventional data processing device adapted to perform conventional post-processing of data, such as target tracking operations, and adapted to output processed data to display processing device 96. Display processing device 96 may be a conventional display processing device adapted to receive processed data and convert processed data into a format suitable for transmission to a display device 98. Display device 98 may be a conventional display device adapted to receive display data from display processor 120 and display it so that it may be observed by an operator. Notably, all components/devices 10 to 98 of FIG. 5 operative to provide an optical signal to AFTA 130, receive an optical signal from AFTA 130 and process the received signal reside on or within towing platform 110. By not requiring any discrete mechanical or electrical devices on either fiber-optic tow cable 120 or AFTA 130, AFTA 130 may achieve a simple optical fiber-only design, thereby increasing reliability and minimizing cost.

Additionally, all components/devices 10 to 98 of FIG. 5 other than successive channel difference device 80 may comprise conventional processing and post-processing devices operative to provide a source for a towed optical fiber array and receive and process signals received from a towed optical fiber array. For purposes of brevity, details of these conventional components/devices are omitted.

Figure 6:
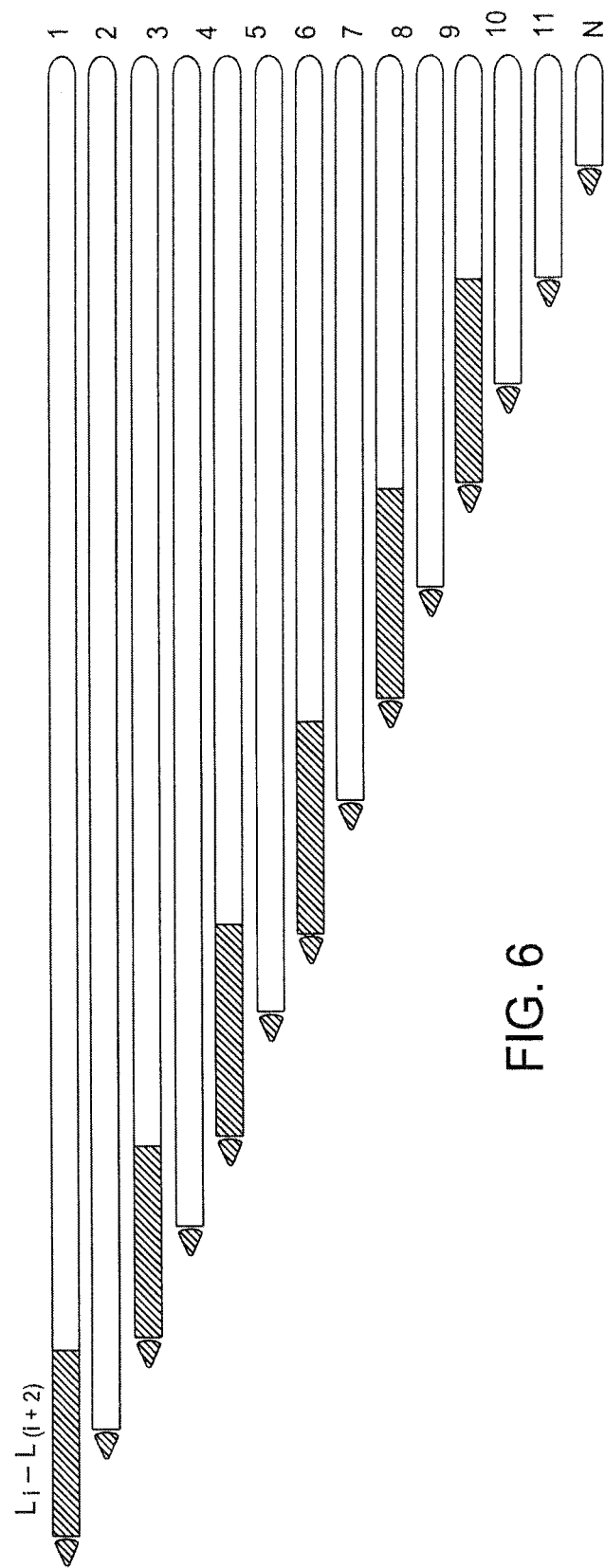
FIG. 6 shows a detailed view of optical fibers according to an alternative embodiment of the present invention.

Alternative configurations of the virtual sensor arrangement may be implemented, for example, to modify the frequency of operation. FIG. 6 shows an alternative configuration of the virtual sensors of an embodiment of the present invention. By differencing every other channel ($L_1 - L_{(i+2)}$) as shown in FIG. 6, as distinct from differencing every consecutive channel as shown in FIG. 3, the resulting virtual elements are twice as long and thereby may be more sensitive to lower frequency operation. Accordingly, AFTA 130 of the present invention may vary the virtual sensor length depending on the desired frequency of operation by altering only the control and processing of the components/devices shown in FIG. 5, thereby adding to the flexibility of the system. The ability to form virtual hydrophones with varying sizes will add functionality to the sonar towed array system, however, it may require further processing to reduce unwanted signals and noise components, such as adaptive noise cancellation operations. These additional operations may be necessary if subtraction of the adjacent fibers is insufficient to cancel noise. Some degree of cancellation may also be required in the optical domain prior to A to D (analog to digital) conversion. For example, if unwanted signal and noise levels are larger than the dynamic range capacity of the processing components, some degree of optical cancellation may be desired to reduce the dynamic range requirements on the electronic circuitry.

While the foregoing describes exemplary embodiments and implementations, it will be apparent to those skilled in the art that various modifications and variations can be made to the present invention without departing from the spirit and scope of the invention.

What is claimed is:

1. A passive acousto-optical sensor system comprising:
a plurality of at least partially overlapping optical fibers of differing lengths each configured to sense an acoustic signal along its length;
a receiver operatively connected to the plurality of optical fibers; and
a processor operatively connected to the receiver and configured to:
subtract an output optical signal of a first optical fiber of the plurality of optical fibers from an output optical signal of a second optical fiber of the plurality of optical fibers, wherein the plurality of optical fibers comprise a predetermined non-zero number of optical fibers whose lengths are intermediate the lengths of the first and second optical fibers, for extracting the acoustic signal associated with the portion of the second optical fiber that does not overlap with the first optical fiber; and
alter an operating frequency of the system by changing the predetermined non-zero number of optical fibers having lengths intermediate the lengths of optical fibers to be subtracted.

2. The system of claim 1, wherein each optical fiber is configured to receive an optical signal at an input thereof, alter a characteristic of the received optical signal according to the sensed acoustic signal, and output the altered optical signal.

3. The system of claim 1, wherein the acousto-optical sensor system is configured to sense acoustic signals exclusively via the plurality of optical fibers.

4. The system of claim 1, wherein the processor is responsive only to the plurality of optical fibers for extracting the sensed acoustic signal.

5. The system of claim 1, further comprising an optical source configured to transmit at least one optical signal to the plurality of optical fibers.

6. The system of claim 5, wherein the receiver comprises an optical transceiver, and wherein the optical source is configured to transmit an optical signal to the transceiver.

7. The system of claim 1, further comprising a beamformer responsive to an acoustic signal extracted by the processor for generating beamformed signal data.

8. The system of claim 7, further comprising a processing device responsive to the beamformed signal data for performing target tracking operations.

9. The system of claim 8, further comprising a display operatively connected to the processing device.

10. A method for processing optical signals in a passive acousto-optical sensor system comprising:
inputting optical signals to a plurality of at least partially overlapping optical fibers of differing lengths;
sensing an acoustic signal acting along the length of the plurality of optical fibers;
outputting a plurality of optical signals indicative of the received acoustic signal from each of the plurality of optical fibers,
subtracting the output optical signal of a first optical fiber of the plurality of optical fibers from the output optical signal of a second optical fiber of the plurality of optical fibers, wherein the plurality of optical fibers comprise a predetermined non-zero number of optical fibers whose lengths are intermediate the lengths of the first and second optical fibers, for extracting an acoustic signal associated with the portion of the second optical fiber which does not overlap with the first optical fiber; and
altering an operating frequency of the system by changing the predetermined non-zero number of optical fibers having lengths intermediate the lengths of optical fibers to be subtracted.

11. A passive optical sensor array system for use in a towed array sensor comprising:
a towing platform configured to tow the array sensor;
an array comprising a plurality of optical fibers of differing lengths, each operative to sense acoustic signals along its length and cause a change in a characteristic of an optical signal provided to each of the plurality of optical fibers; and
a control system comprising components operative to generate the optical signal and process received return optical signals by subtracting an output optical signal of a first optical fiber of the plurality of optical fibers from an output optical signal of a second optical fiber of the plurality of optical fibers, wherein the plurality of optical fibers comprise a predetermined non-zero number of optical fibers whose lengths are intermediate the lengths of the first and second optical fibers, for extracting an acoustic signal associated with the portion of the second optical fiber that does not overlap with the first optical fiber, wherein each of the components of the control system is arranged on or within the towing platform.

12. The system of claim 11, wherein the towing platform comprises a powered vessel or ship.

13. The system of claim 12, wherein the array sensor consists substantially of only the plurality of optical fibers disposed within a housing or cable jacket.

14. The system of claim 11, wherein the control system includes an optical transceiver.

15. The system of claim 11, further comprising a beamformer responsive to an acoustic signal extracted by the control system for generating beamformed signal data.

16. The system of claim 15, further comprising a processing device responsive to the beamformed signal data for performing target tracking operations.

17. The system of claim 16, further comprising a display operatively connected to the processing device.

* * * * *